March 13, 1973  R. BOUCHER  3,719,964
UPPER STRETCHING AND CLAMPING MECHANISM
Filed Jan. 28, 1972  7 Sheets-Sheet 1

March 13, 1973  R. BOUCHER  3,719,964
UPPER STRETCHING AND CLAMPING MECHANISM
Filed Jan. 28, 1972  7 Sheets-Sheet 2

March 13, 1973   R. BOUCHER   3,719,964
UPPER STRETCHING AND CLAMPING MECHANISM
Filed Jan. 28, 1972   7 Sheets-Sheet 3

United States Patent Office 3,719,964
Patented Mar. 13, 1973

3,719,964
UPPER STRETCHING AND CLAMPING
MECHANISM
Raymond Boucher, Manchester, N.H., assignor to
Jacob S. Kamborian Estate, West Newton, Mass.
Filed Jan. 28, 1972, Ser. No. 221,619
Int. Cl. A43d 21/00
U.S. Cl. 12—10.5                                   2 Claims

ABSTRACT OF THE DISCLOSURE

A machine for stretching an upper about the heel end of a last and clamping the heel portion of the upper to the last prior to wiping the margin of the heel portion of the upper against an insole located on the bottom of the last. The machine includes a U-shaped clamp pad having pad legs movable towards the last to effect the clamping and pincers mounted to the pad legs operative to grip the breast line portions of the upper margin prior to movement of the pad legs toward the last.

BACKGROUND AND SUMMARY OF THE INVENTION

In heel lasting operations, wherein the margin of the heel portion of an upper mounted on a last is wiped against an insole located on the last bottom, it is desirable to stretch the upper about the heel of the last and clamp the heel portion of the upper against the last prior to the wiping operation. This invention is concerned with an improved machine for performing the stretching and clamping operations.

The machine, which is constructed similarly to the machine of Pat. No. 3,506,992, includes a pair of pad legs that are mounted for movement from initial outer positions in a path having inward and toeward components towards the last to clamp the heel portion of the upper against the last. Breast line pincers, constructed similarly to the pincers shown in Pat. No. 3,579,693, are mounted to the pad legs for movement therewith. Unlike the arrangement in Pat. No. 3,506,992, the machine is so controlled that the pincers are caused to grip the breast line portions of the upper margin while the pad legs are in their outer positions, after which the pad legs, together with the pincers, are caused to move in said path. This enables the pincers to stretch the upper about the heel end of the last before the pad legs are effective to clamp the upper against the last.

While the illustrative embodiment of the invention discloses a machine operating on the heel portion of a shoe, it is within the purview of the invention to, in a similar manner, stretch the upper about the toe portion of the last prior to clamping the upper to the last and wiping the toe portion of the upper margin against the insole.

DESCRIPTION OF THE PREFERRED EMBODIMENT

Figure 1:
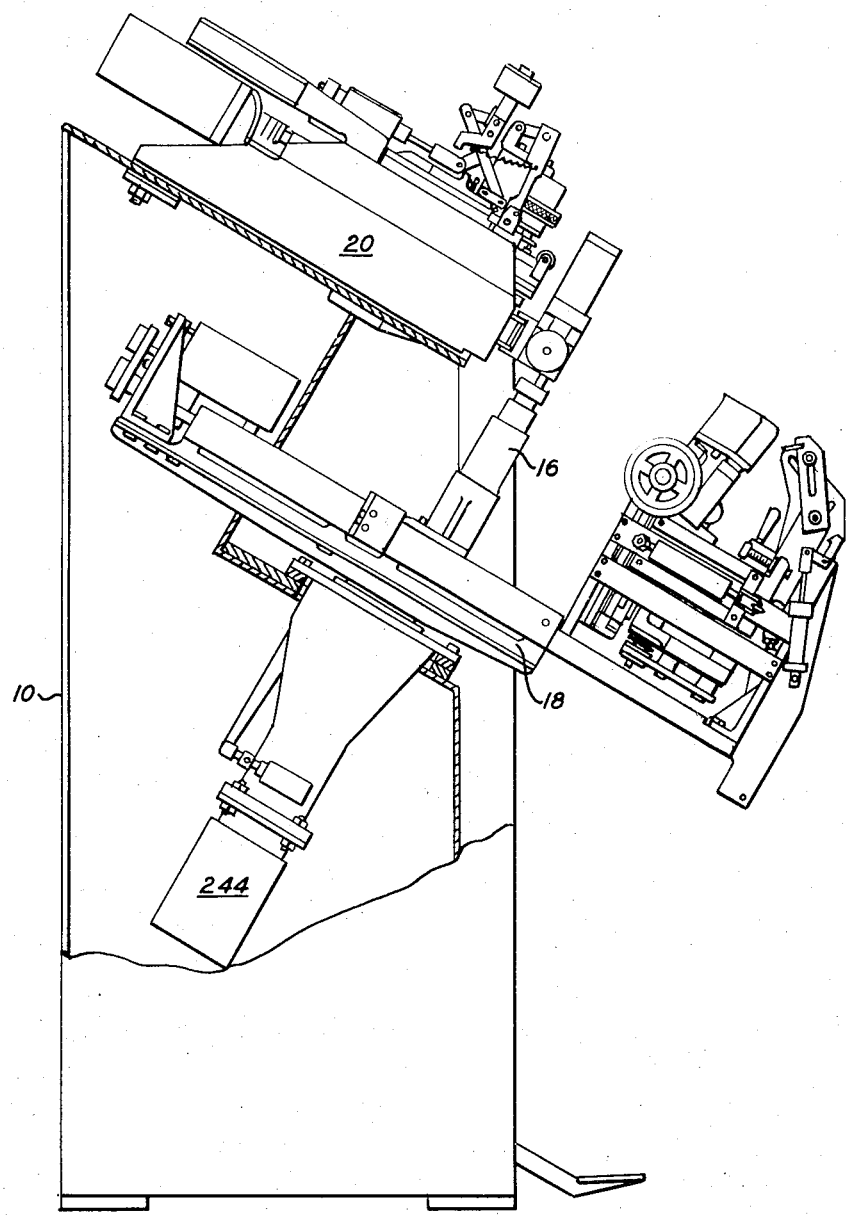
FIG. 1 is a side elevation of the machine.

Referring to FIG. 1, the machine includes a frame 10 to which is mounted a column 16. The machine is tilted about 30 degrees to enable the operator to have ready access thereto. For ease of application, the longitudinal axis of the column 16 will be considered to be in a vertical plane and a plane at right angles to the first mentioned plane will be considered to be a horizontal plane. In operating the machine, the operator stands to the right of the machine, as seen in FIG. 1, and parts moving toward the operator (left to right in FIG. 1) will be described as moving forwardly while parts moving away from the operator (right to left in FIG. 1) will be described as moving rearwardly.

A shoe assembly support arrangement described below is mounted to the top of the column 16, and a head 20 is mounted in the frame 10 rearwardly of the column 16.

Referring to FIGS. 2 and 5–7, a main slide plate 22 (FIG. 5) is slidably mounted in the head 20 for forward-rearward movement. A fluid actuated motor 24, mounted to the head 22, has a piston rod 26 connected to a bracket 28 mounted to the slide plate 22 to effect this movement. A heel clamp slide 30 (FIGS. 2 and 5) is slidably mounted below the main slide plate 22 for forward-rearward movement in guideways 32 mounted to the main slide plate. Mounted to the rear of the heel clamp slide 30 is a bracket 34 having a pair of laterally extending arms 36. An air actuated motor 38 is pivoted to each of the arms 36 on a pin 40. Each motor 38 has a piston rod 42 extending forwardly thereof. A pair of arms 44 are pivotally mounted to pins 46 which are secured to the forward end of the heel clamp slide 30. A shoulder 50 is provided on the heel clamp slide 30 rearwardly of the pins 46 to limit the extent that the arms 44 may pivot in a rearward direction. When at rest, the arm 44 are maintained in abutment against the shoulder 50 by means of tension springs 52 which are each connected at one end to an arm 36 and at its other end to a clip 54. The clips 54 are rigidly fastened to the outer extremities of the arms 44 by pins 56. A pair of sliding links 58, having longitudinal slots 60 formed at their midportions, are pivotally connected by means of pins 62 to angle brackets 64, the angle brackets 64 being rigidly fastened to the piston rods 42 of the motors 38. The links 58 are also movably connected to the arms 44 by means of engagement of the slots 60 and the pins 56 so that activation of the motors 38 to cause the piston rods 42 to move forwardly (to the left in FIG. 2) will cause the links 58 to have substantially linear forward movement, being guided by the pins 56. During the forward motion of the links 58, the pins 56 and consequently the arms 44 are rigidly maintained in a rearward position by means of the tension springs 52. Another link 66 is pivotally mounted at one end to each of the arms 44 by means of pins 68 which are secured to the arms 44 at their midportions. The other end of each link 66 is pivotally mounted to a pin 62 so that as the motors 38 impart substantially forward motion to the links 58, rotary motion about the pins 68 will be simultaneously imparted to the links 66. A bolt 70 is threaded into each arm 44 in such a manner that it is in registry with the plane of rotation of the links 66 so that as the links 66 rotate in response to actuation of the motors 38 they will abut the rearward ends of the bolts 70, thereby terminating the substantially forward linear motion of the links 58, and cause the arms 44, the links 58 and the links 66 to become rigid with respect to each other. When such a relative rigid relationship occurs, further actuation of the motors 38 to cause further forward motion of the piston rods 42 will cause the arms 44, the links 58 and the links 66 to rotate, as rigid units, about the pins 46, overcoming the tension of the springs 52 with the motors 44 swinging about the axes of the pins 40.

Figure 2:
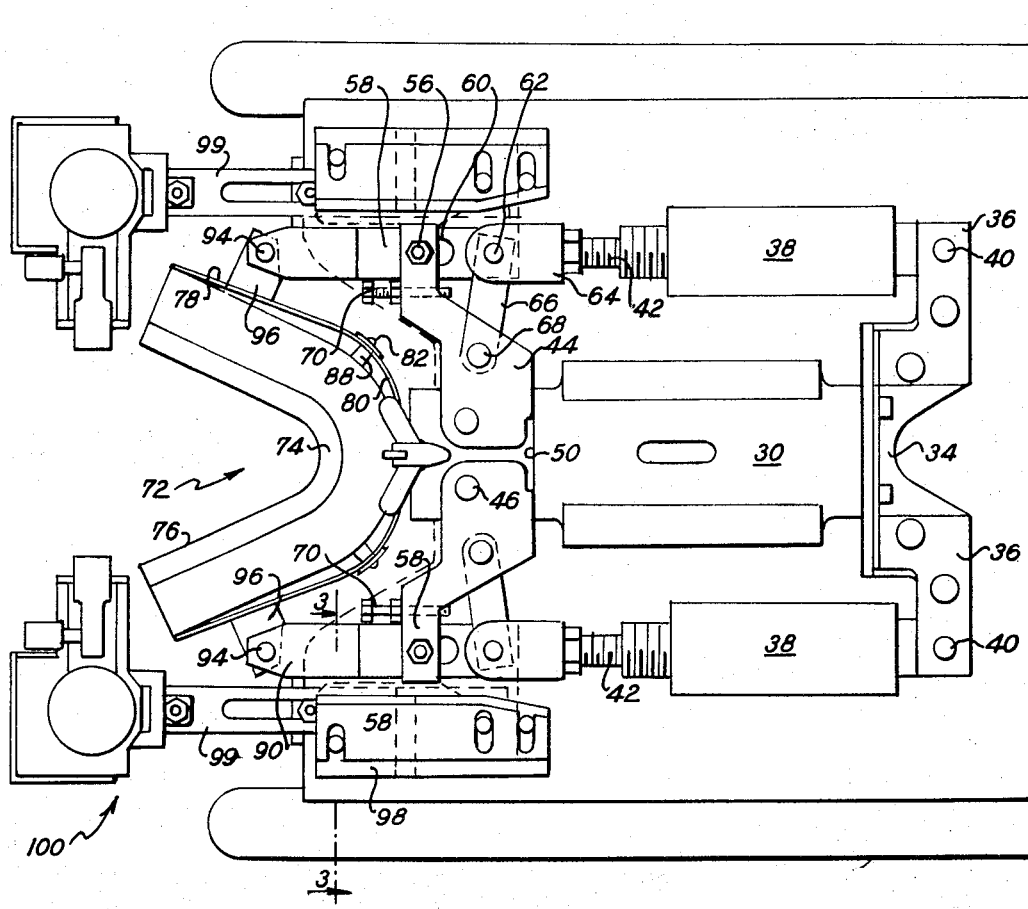
FIG. 2 is a plan view of a heel clamp that incorporates the pad legs, together with its operating mechanism, and of the breast line pincers.

As shown in FIG. 2, a substantially U-shaped heel clamp pad 72, having a bight 74 and a pair of legs 76 extending forwardly of the bight on opposite sides of the bight, is located forwardly of the heel clamp slide 30 between the links 58. The clamp pad 76 is formed from a yieldable material such as rubber. Flexible metal front bands 78 and back bands 80 are pivoted to extend about the outer periphery of the pad 72. Hinges 82 pivotally connect the front and back bands and a hinge 84 (FIG. 7) pivotally connects the back bands. A positioning lug 87 extends rearwardly of the hinge 84 and is received in a slot formed in the forward end of the heel clamp slide 30. The front ends of the bands 78 are connected to the front ends of the exterior surfaces of the pad legs 76 by screws (not shown). Lugs 88, extending inwardly of the hinges 82, underlie the pad 72 to thereby support it. A pair of vertically spaced plates 90 and 92 (see FIG. 3) are mounted to and extend forwardly of each link 58. The fronts of each pair of plates 90, 92 are pivoted to a pin 94. The fronts of each pair of plates 90, 92 are pivoted to a pin 94. Each pin 94 extends through a lug 96 that is secured to its associated front band 78.

A guideway 98 (FIGS. 2 and 3) is located outwardly of each link 58, each guideway being secured to the slide plate 22. A bracket 99 is secured to each link 58 outwardly thereof and extends forwardly thereof. A pincers assembly 100 is secured to the front of each bracket 99. Since both the pad legs 76 and the pincers assemblies 100 are connected to the links 58, the pincers assemblies have movement in unison with the pad legs.

Figure 10:
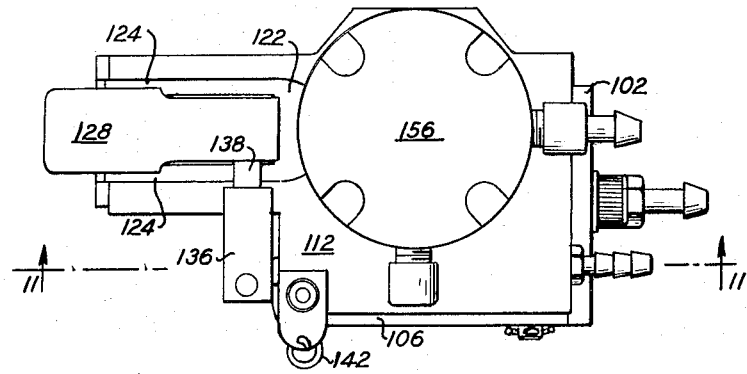
FIG. 10 is a plan view taken on the line 10—10 of FIG. 9.
Figures 8, 9:
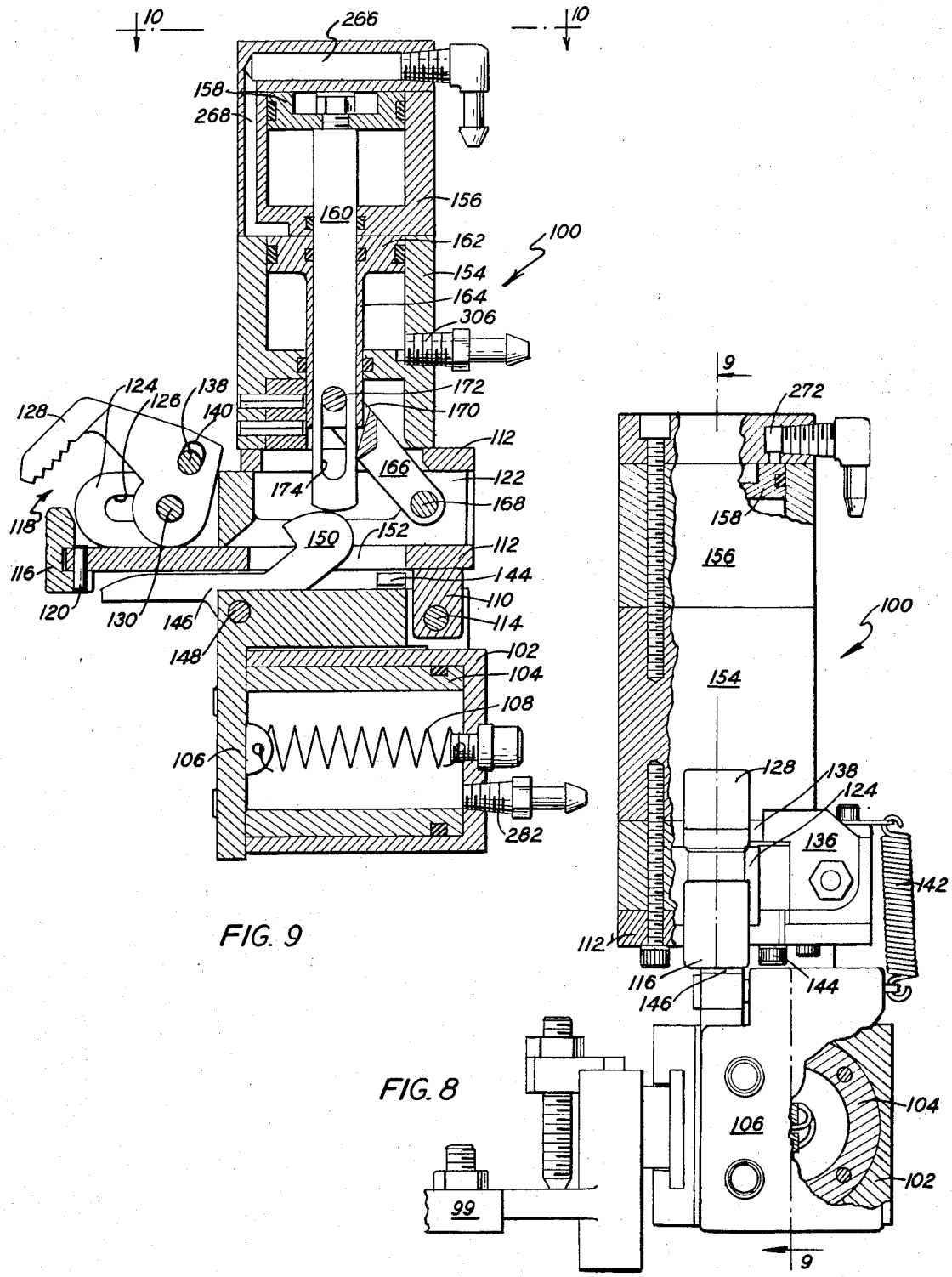
FIG. 8 is an elevation of a breast line pincers assembly.
FIG. 9 is a section taken on the line 9—9 of FIG. 8.

Referring to FIGS. 8-10, each pincers assembly 100 comprises a base 102. A sleeve 104 is mounted for inward-outward movement in the base 102. A support 106 is secured to the sleeve 104. A return spring 108 yieldably urges the sleeve 104 and the support 106 outwardly to the FIG. 9 position. A depending lug 110 of a housing 112 is pivoted to the support 106 by means of a pin 114 so that the housing can swing heightwise with respect to the support. The inner portion of the housing bottom has an outer jaw 116 of a pincers 118 secured thereto by a pin 120.

A bar 122 is slidably mounted in the housing 112 for inward-outward movement. The inner end of the bar 122 is bifurcated to form a pair of legs 124 having inwardly-outwardly extending slots 126 formed therein. An inner pincers jaw 128 of the pincers 118 is slidably mounted on the bar 122 for inward-outward movement by means of a pin 130 that is secured to the jaw 128 and is slidably mounted in the slots 126.

Figure 11:
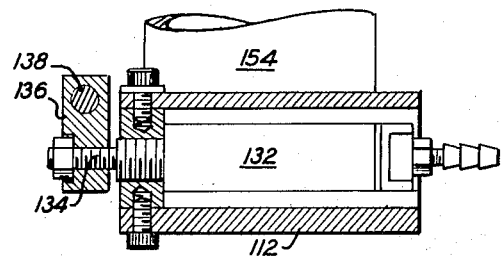
FIG. 11 is a section taken on the line 11—11 of FIG. 10.

An air actuated motor 132 (FIG. 11) is mounted to the housing 112. The inwardly extending piston rod 134 of the motor 132 is secured to a block 136. A laterally extending pin 138 is secured to the block 136 and is slidably received in a slot 140 in the jaw 128.

A tension spring 142, extending between the support 106 and the housing 112, serves to yieldably urge the housing downwardly about the axis of the pin 114 to a position wherein buttons 144, that are secured to the housing, bear against the support 106. A lever 146 is pivoted to the support 106 by a pin 148. The lever 146 extends inwardly of the pin 148 beneath the bottom of the housing 112 and has a leg 150 that extends outwardly and upwardy of the pin 148 through a cutout 152 formed in the bottom of the housing.

A cylinder 154 is rigidly secured to the top of the housing 112 and a cylinder 156 is rigidly secured to the top of the cylinder 154, the cylinders 154 and 156 forming extensions of the housing 112. A piston 158, slidably mounted in the cylinder 156, has a downwardly depending piston rod 160 that is in alignment with the lever leg 150. A piston 162, slidably mounted in the cylinder 154, has a hollow, downwardly depending piston rod 164. The piston rod 160 is slidable in and extends through the hollow of the piston rod 164. A link 166 is pivoted to the back of the bar 122 by a pin 168. The link 166 extends upwardly and inwardly from the pin 168. The end of the link 166 remote from the pin 168 is formed into a clevis 170 that is pivoted to the piston rod 164 by a pin 172. The pin 172 is slidable in a heightwise extending slot 174 that is formed in the piston rod 160.

Figure 7:
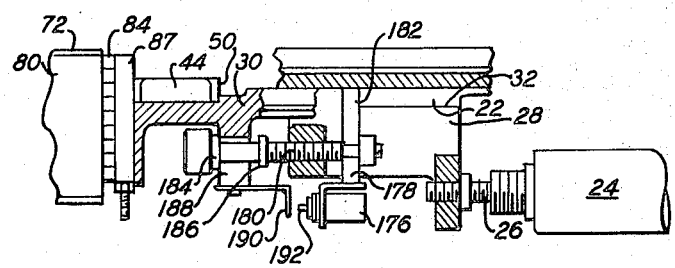
FIG. 7 is a section taken on the line 7—7 of FIG. 6.
Figure 6:
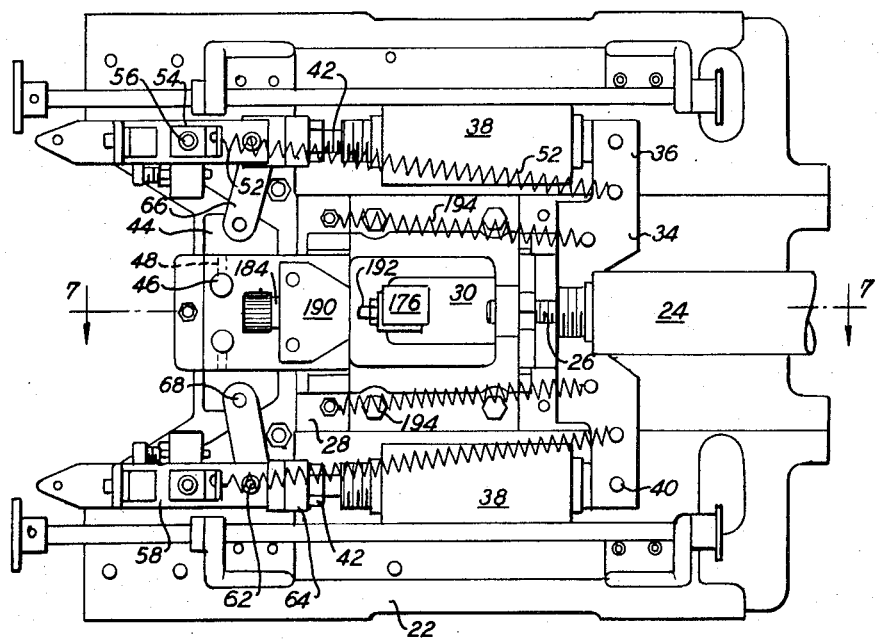
FIG. 6 is a bottom view of the heel clamp operating mechanism.

Referring to FIGS. 6 and 7, a pilot valve 176 depends from a bar 178. The bar 178 has a hole formed therein for rotatable accommodation of the rearward end of a shaft 180. The midportion of the shaft 180 is threaded into the forward end of the bracket 28 so as to be rigidly connected to and partake of the motion of the main slide plate 22. A flinger 182 extends upwardly from and is made integral with the bar 178 and is contained in a longitudinal slot 184 (FIG. 5) formed in the heel clamp slide 30. Formed at the forward end of the shaft 180 are spaced collars 184 and 186. A depending leg 188, which is an integral part of the heel clamp slide 30, straddles the shaft 180 at a point intermediate the collars 184 and 186. It may thus be seen that the clamp slide 30 and all components mounted thereto may slide with respect to the main slide plate 22 a distance that is governed by the clearance between the depending leg 188 and the collars 184 and 186. A stop 190 is secured to the bottom of the depending leg 188 and extends rearwardly to be in alignment with the plunger 192 of the pilot valve 176. In the idle condition of the machine, the heel clamp slide 30 is maintained in a forward position relative to the main slide plate 22 with the depending leg 188 in abutment with the collar 184 by means of a pair of tension springs 194 that have one end connected to the bracket 28 and the other end connected to an arm 36 of the bracket 34 which is mounted to the rear of the heel clamp slide 30.

Figure 4:
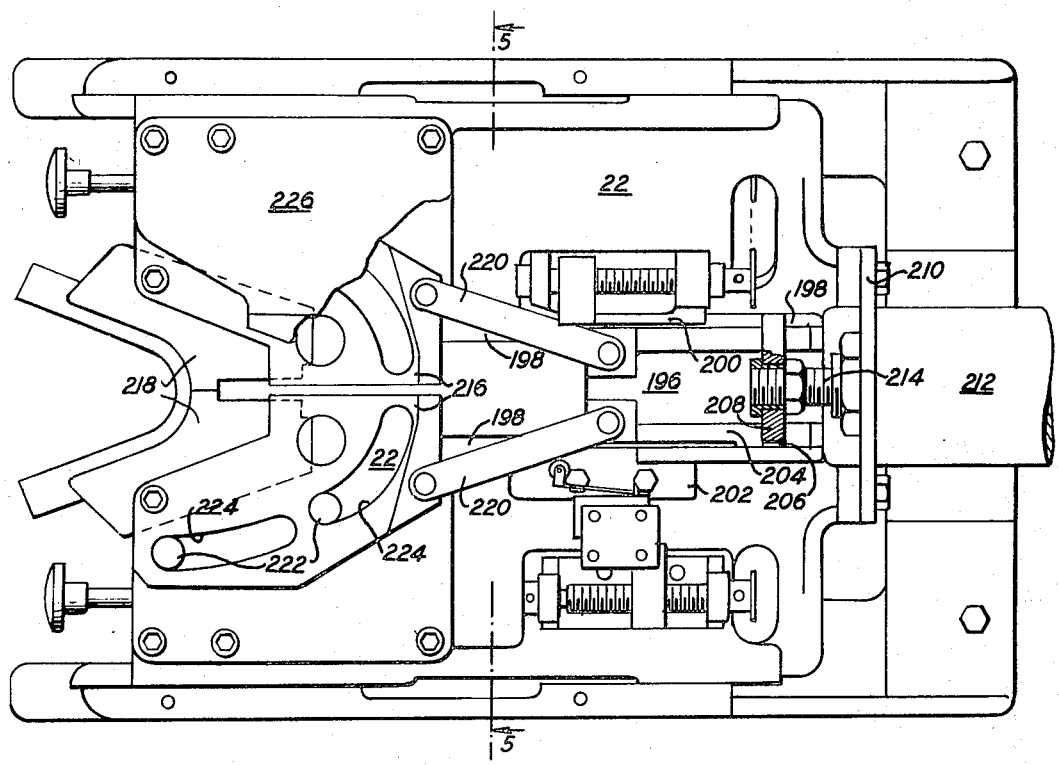
FIG. 4 is a plan view of wipers and of a wiper operating mechanism.
Figure 5:
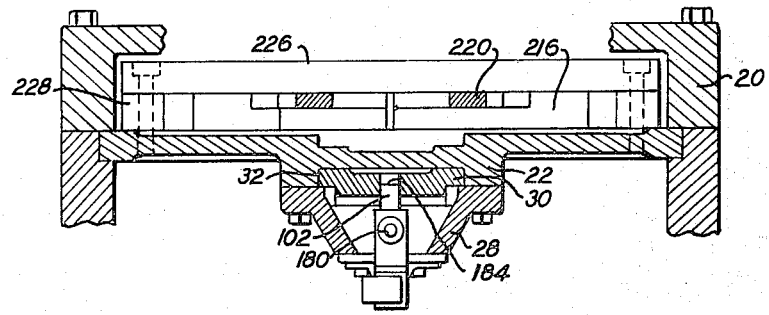
FIG. 5 is a section taken on the line 5—5 of FIG. 4.

Referring to FIG. 4, a wiper slide 196 is slidably mounted for forward and rearward movement in guideways 198 formed in the upper surface of the main slide plate 22. The wiper slide 196 is retained in the guideways 198 by gibs 200 and 202. The wiper slide 196 has a pair of upwardly extending longitudinal walls 204, each wall having a vertical slot 206 formed therein. A connecting bar 208 rests laterally within the slots 206. The rear of the main slide plate 22 is formed into a bracket 210 to which is mounted an air actuated motor 212 having a forwardly extending piston rod 214, the piston rod 214 being connected to the connecting bar 208 so that activation of the motor 212 will cause the wiper slide 196 and all components carried thereon to move forwardly or rearwardly in the guideways 198. Slidably mounted to the upper surface of the forward end of the main slide plate 22 are a pair of wiper cams 216 to which are mounted wipers 218. A pair of links 220 pivotally connect the wiper slide 196 and the wiper cams 216 so that motion may be transmitted to the wiper cams 216 and consequently the wipers 218 upon actuation of the wiper slide 196 by the motor 212. For the purpose of guiding the wiper cams 216 in a desirable predetermined path, rollers 222 are rotatably mounted to the main slide plate 22 and protrude upwardly into cam slots 224 formed in the wiper cams 216 for accommodation of the rollers 222. The wiper cams 216 are maintained in sliding contact with the main slide plate 22 by means of a cover 226 which is bolted to the main slide plate 22 and is spaced therefrom by means of spacers 228 (FIG. 5), the spacing between the main slide plate 22 and the cover 226 being such that the wiper cams 216 may have horizontal sliding motion only, there being insufficient clearance for allowance of any substantial vertical movement.

In the idle condition of the machine, the piston rod 26 is retracted into the motor 24 to maintain the main slide plate 22 and the parts carried thereby in a rearward position with the heel clamp pad 72 and the wipers 218 in an out-of-the-way position; the piston rods 42 are retracted into the motors 38 to maintain the heel clamp pad legs 76 in a relatively spread apart condition; there is no pressurized air entering the bases 102 so that the supports 106 are urged outwardly to the FIG. 9 position by the springs 108; the piston rods 134 are retracted into the motors 132 so that the inner pincers jaws 128 are in the outer open positions shown in FIG. 9; the piston rods 160 are retracted into the cylinders 156; the piston rods 164 are retracted into the cylinders 156 so that the pins 172 are at the tops of the slots 174 and the bars 122 are in outer positions; and the piston rod 214 is retracted into the motor 212 to thereby maintain the wipers 218 in the retracted position shown in FIG. 4.

Figure 13:
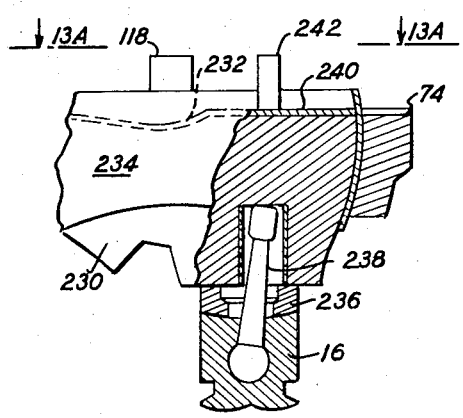
FIG. 13 is a representation of a shoe assembly in the machine with the breast line portions of the upper margin being gripped by the breast line pincers while the pad legs are in their outer positions.
Figure 13A:
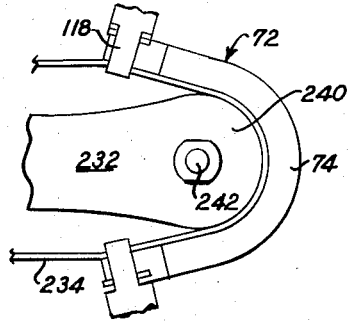
FIG. 13A is a view taken on the line 13A—13A of FIG. 13.

Referring to FIGS. 13 and 13A, a shoe assembly is provided that comprises a last 230 having an insole 232 secured to its bottom and an upper 234 mounted thereon in such a manner that the margin of the upper extends away from the insole. The shoe assembly is placed bottom-up on a shoe assembly support arrangement that is formed of a support plate 236 and a last pin 238 with the last pin 238 entering the conventional last pin hole in the last. The plate 236 and the last pin 238 are mounted to the top of the column 16. The machine is now operated, in the manner disclosed in Pat. No. 3,484,880 so that the insole heel seat 240 is bearing against a heel hold-down 242 and the bight 74 of the pad 72 is bearing against the heel end extremity of the shoe assembly with the pad legs 76, as well as the pincers 118, spaced from the sides of the shoe assembly.

Referring to FIG. 1, the platform 18, together with the column 16, is mounted for heightwise movement and is raised to bring the shoe assembly from an initial lower position to the position shown in FIG. 13 wherein the insole is bearing against the hold-down 242 by the operation of a motor 244 in the manner shown in Pat. No. 3,320,626. The heel clamp pad 72 is brought to the FIG. 13A position by the operation of the motor 24 to project its piston rod 26 forwardly and thus move the main slide plate 22 forwardly.

The forward movement of the main slide plate 22 carries the heel clamp pad 72 and the wipers 218 forwardly from their initial position until the the pad bight 74 abuts the heel end of the shoe assembly, as shown in FIG. 13A, thereby terminating the forward motion of the heel clamp pad. The main slide plate 22 and the wipers 218 carried thereon continue to move forwardly until the collar 186 (FIG. 7) on the shaft 180 abuts the depending leg 188 of the heel clamp slide 30. Simultaneously with the abutment of the collar 186 and the depending leg 188, the plunger 192 of the valve 176 is depressed by reason of its abutment with the stop 190 to thereby open this valve. The opening of the valve 176, by means of a control arrangement shown in Pat. No. 3,436,779, serves to lock the piston rod 26 of the motor 24 in position to thereby lock the main slide plate 22 in its forward position.

The motors 244 and 24 are operated at about the same time, and, during the raising of the shoe assembly by the motor 244, the breast line portions of the margin of the upper 234 are guided between the open jaws of the pincers 118.

Figure 12:
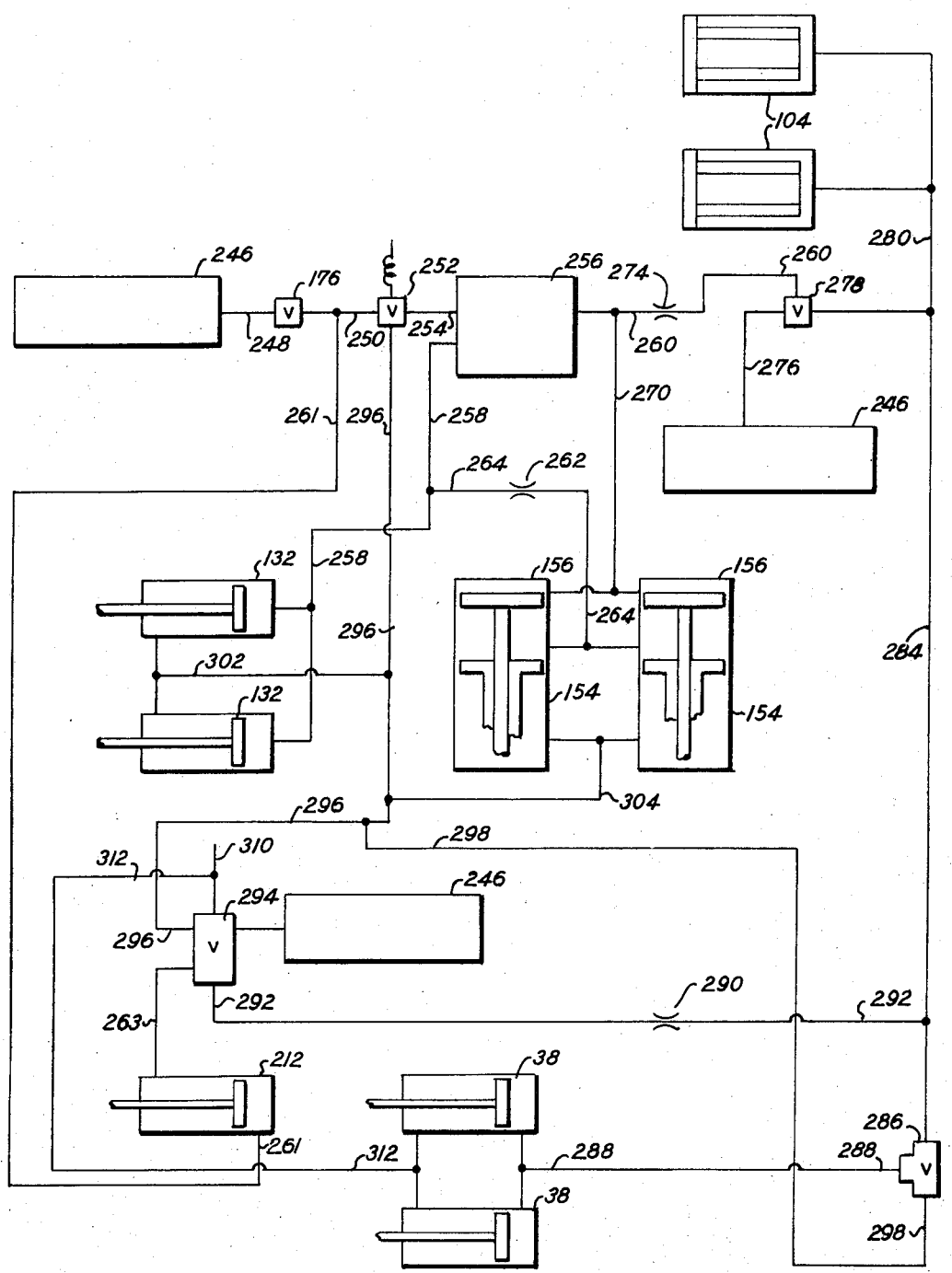
FIG. 12 is a schematic representation of a portion of the control circuit of the machine.

Referring to the circuit of FIG. 12, the opening of the valve 176 also enables pressurized air to pass from a source 246 through a line 248, the valve 176, a line 250, a normally open spring return valve 252 and a line 254 to a timer 256. The timer 256 is a standard commercial item so constructed that pressurized air exits from the timer through a line 258 a predetermined time after entering the timer through the line 254 and exits from the timer through a line 260 a predetermined time after exiting through the line 258.

The opening of the valve 176 also enables pressurized air to pass from the line 250 through a line 261 to the head end of the motor 212. This does not effect operation of the motor 212 at this time because pressurized air is entering the rod end of this motor through a line 263.

Pressurized air exiting from the timer 256 through the line 258 enters the motors 132 so as to cause these motors to move their piston rods 134 inwardly and thereby move the pins 138 inwardly. The inward movement of the pins 138 causes the inner pincers jaws 128 to move inwardly with the pins 130 moving inwardly in the slots 126 until the pins 130 reach the inner ends of the slots 126, after which continued inward movement of the pins 138 causes the jaws 128 to swing downwardly about the axes of the pins 130 with the pins 138 sliding in the slots 140. As a result, each jaw 128 is positioned inwardly of and in registration with its associated outer jaw 116 so that the breast line portions of the margin of the upper are located between the jaws of the pincers 118.

After this, pressurized air passes from the line 258 through a flow control valve 262 and a line 264 to the cylinders 154 through ports 266 and 268 (FIG. 9) to lower the piston rods 164 with the pins 172 moving downwardly in the slots 174. This causes the links 166 to move the bars 122 and the inner jaws 128 outwardly under the yieldable forces of the pressurized air in the cylinders 154 so as to cause the breast line portions of the upper margin to be gripped between the jaws of the pincers 118.

This is followed, after a time delay determined by the setting of the timer 256, by the flow of pressurized air through the line 260 and a line 270 to the cylinders 156 through ports 272 (FIG. 8) to lower the piston rods 160 to cause the bottoms of the piston rods 160 to engage the lever legs 150 and thus swing the levers 146 about the axes of the pins 148 so as to raise the housings 112 about the axes of the pins 114 against the forces of the springs 142. This raising of the housings 112 raises the pincers 118 and the breast line portions of the upper margin gripped by the pincers 118 under the yieldable forces of the pressurized air in the cylinders 154. This has the effect of stretching the breast line portions of the upper about the last.

After this, pressurized air passes from the line 260 through a flow control valve 274 to a valve 278 to shift this valve. The shifting of the valve 278 enables pressurized air to pass from the source 246 through a line 276, the valve 278 and a line 280 to the sleeves 104 through ports 282 (FIG. 9). The shifting of the valve 278 also enables pressurized air to pass from the valve 278 through a line 284 and a shuttle valve 286 and a line 288 to the motors 38 to actuate these motors.

Figure 3:
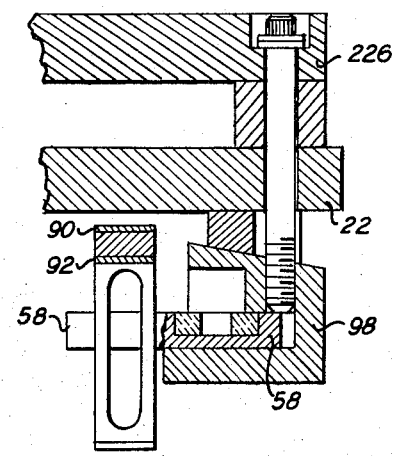
FIG. 3 is a section taken on the line 3—3 of FIG. 2.
Figure 14:
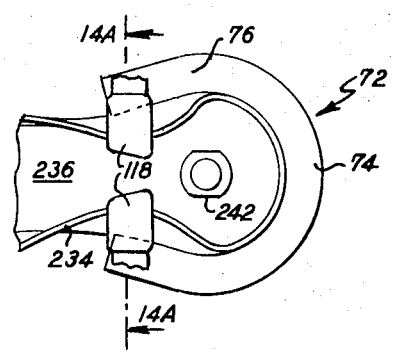
FIG. 14 is a representation of the shoe assembly as it appears in the machine after the pad legs have clamped the upper against the last and the breast line portions of the upper margin have been moved inwardly of the insole periphery by the breast line pincers.
Figure 14A:
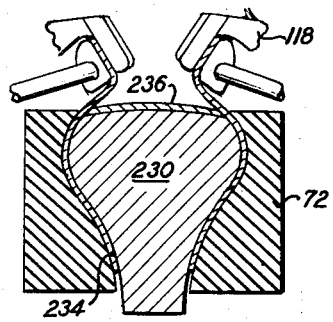
FIG. 14A is a view taken on the line 14A—14A of FIG. 14.

The actuation of the motors 38 causes the heel clamp driving mechanism shown in FIGS. 2, 3 and 6 to operate in the manner described above to move the heel clamp pad 72 from the FIG. 13A position to the FIGS. 14 and 14A position. The legs 76 of the heel clamp pad 72 are initially stretched forwardly towards the toe of the shoe assembly and are subsequently swung inwardly about the axes of the pins 46 until they engage the side walls of the shoe assembly in the regions of the breast lines, so that all of the inner wall of the pad 72 engages the heel of the shoe assembly. Since the pincers assemblies 10 are so mounted, in the manner described above, as to move in unison with the pad legs, the movement of the pad legs is duplicated by the pincers 118 so as to cause the gripped breast line portions of the upper margin to also first move toewardly and then move inwardly about the axes of the pins 46. This pincers movement causes the heel portion of the upper that extends between the breast line portions of the upper to be stretched tightly about the heel of the last for the below described heel wiping operation before the upper 234 is pressed against the last 230 by the pad 72 and to be retained in this stretched condition by the clamping action of the pad 72 in pressing the upper against the last.

The admission of the pressurized air to the sleeves 104 moves the supports 106, the housings 112 and the pincers 118 inwardly relative to the pad legs 76 with the pincers moving to the position shown in FIGS. 14 and 14A. This has the effect of laying the breast line portions of the upper margin over the insole so that, in the below described wiping operation, the wipers 218 can effectively wipe the heel portion of the upper margin against the insole without the upper margin fading away from the wipers.

Figure 15:
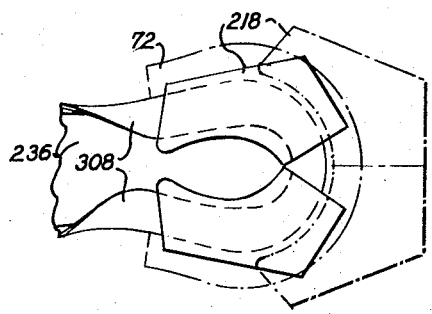
FIG. 15 is a representation of the shoe assembly as it appears in the machine at the completion of a heel wiping operation.

After the admission of pressurized air to the sleeves 104 and the actuating of the motors 38, pressurized air passes from the line 284 through a flow control valve 290 and a line 292 to a valve 294 to shift this valve. Prior to the shifting of the valve 294, pressurized air had flowed into the line 263 from the source 246 through this valve. The shifting of the valve 294 cuts off the flow of air entering the rod end of the motor 212 through the line 263 so that the pressurized air entering the blind end of the motor 212 through the line 261 is effective to actuate this motor. The actuation of the motor 212 causes the wiper slide 196 to move forwardly thereby imparting motion to the wiper cams 216 and consequently the wipers 218 by means of the links 220. The wipers 218 are guided in their movement by the engagement of the cam slots 224 with the rolls 222 so as to cause the wipers to move from the phantom position of FIG. 15 to the solid position and thereby engage the upstanding upper margin that extends from the heel and extremity of the shoe assembly to the breast line areas gripped by the pincers 118 and fold or wipe the margin against the heel seat portion of the insole 236. The wiped upper margin is bonded to the insole by means of cement that had previously been applied into the angle formed by the upper margin and the insole by a suitable mechanism.

The shifting of the valve 294 enables pressurized air to pass from the source 246 through the valve 294 and a line 296 to the spring return valve 252 to shift this valve to closed position. The closing of the valve 252 cuts off the flow of pressurized air from the timer 256 to the motor 132, the cylinders 154 and 156, the sleeves 104, and the motors 38, but pressurized air continues to flow to the motors 38 from the valve 294 through the line 296, a line 298 and the shuttle valve 286.

The shifting of the valve 294 also causes pressurized air to pass from the line 296 to the motors 132 through a line 302 to return these motors to their idle position.

The shifting of the valve 294 also causes pressurized air to pass from the line 296, through a line 304 and ports 306 (FIG. 9) into the cylinders 154 to raise the pistons 162 to their idle positions. The raising of the pistons 162, through the connections formed by the pins 172 and slots 174, serves to raise the pistons 158 to their idle position.

The cutting off of the flow of air to the sleeves 104, pursuant to the shifting of the valve 294, enables the springs 108 to return the sleeves 104 to their idle position.

From the foregoing, it can be seen that, at the commencement of the wiping operation, while the wipers 218 are effecting their wiping operation and the clamp pad 72 continues to press the upper against the last, the pincers 118 are caused to release the breast line portions of the upper margin so that they will not interfere with the wiping operation. Because the breast line area of the upper margin, indicated in FIG. 15 by number 308, are laid down against the insole by the pincers 118 at the commencement of the wiping operation, the wipers 218 are better able to wipe or fold the full width of the heel portion of the upper margin against the insole.

During the wiping operation, the hold-down 242 is raised out of the path of the wipers 218 in the manner shown in Pat. No. 3,484,880.

After the completion of the wiping operation to complete the machine cycle, the valve 294 is shifted to its original position by pressurized air entering it through a line 310 so that pressurized air is again entering the rod end of the motor 212 through the line 263 and the air entering the blind ends of the motors 38 through the line 298 is cut off. Pressurized air also passes from the line 310 through a line 312 to the rod ends of the motors 38 to cause these motors to return the heel clamp pad 72 to its idle position. The return of the pad 72 to its idle position causes the valve 176 to close to cut off the pressurized air entering the motor 212 through the line 261, thus enabling the air in the line 263 to operate the motor 212 to return the wipers 218 to their idle position.

At the completion of the machine cycle, the parts that had not already done so are returned to their idle position. At the beginning of the following machine cycle, the air in the line 310 is shut off.

I claim:

1. A machine for stretching a selected end portion of an upper about a last and clamping said portion of the upper against the last prior to wiping the margin of said upper portion against the corresponding portion of an insole located on the bottom of the last comprising: means for supporting a shoe assembly that comprises the last having the upper mounted thereon and the insole located on its bottom so that said end of the shoe assembly faces rearwardly; a clamp pad leg, located outwardly of each side of the shoe assembly, mounted for movement between an initial position that is spaced from the shoe assembly and a clamping position of engagement with the shoe assembly in a path having inward and forward components; a gripping means mounted for movement with each of said legs; means for initially locating the pad legs, together with the gripping means, in said initial positions; means for causing the gripping means, while they are in said initial positions, to grip portions of the upper margin that are forward of said end of the shoe assembly; and means for thereafter moving the pad legs, together with the gripping means, from said initial positions to said clamping positions to cause the pad legs to clamp said portion of the upper against the last with the gripping means stretching the upper about said end of the last prior to the clamping of the upper against the last by the pad legs.

2. The machine as defined in claim 1 further comprising: means mounting each gripping means for inward-outward movement with respect to its associated pad leg; means for initially retaining the gripping means in outer positions with respect to the pad legs; and means, operative concomitantly with the movement of the pad legs from said initial positions, to cause the gripping means to move inwardly with respect to the pad legs and lay the gripped upper margin portions against the insole.

References Cited

UNITED STATES PATENTS

| | | | |
|---|---|---|---|
| 3,237,224 | 3/1966 | Kamborian | 12—10.5 |
| 3,189,924 | 6/1965 | Kamborian et al. | 12—14.4 |
| 3,579,693 | 5/1971 | Robinson | 12—14.5 |

PATRICK D. LAWSON, Primary Examiner